C. H. HARRIS.
COMBINED CABINET AND TABLE.
APPLICATION FILED APR. 21, 1913.
1,129,800.
Patented Feb. 23, 1915.
4 SHEETS—SHEET 1.
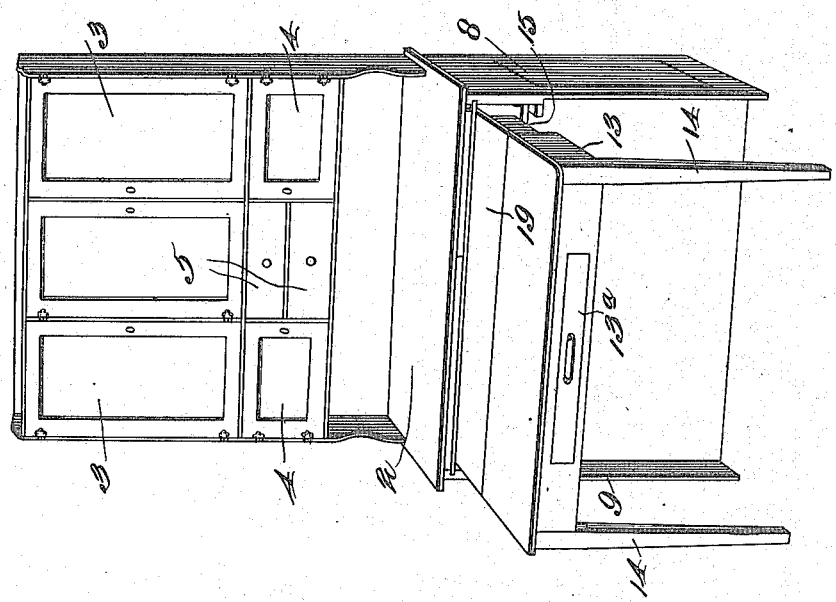
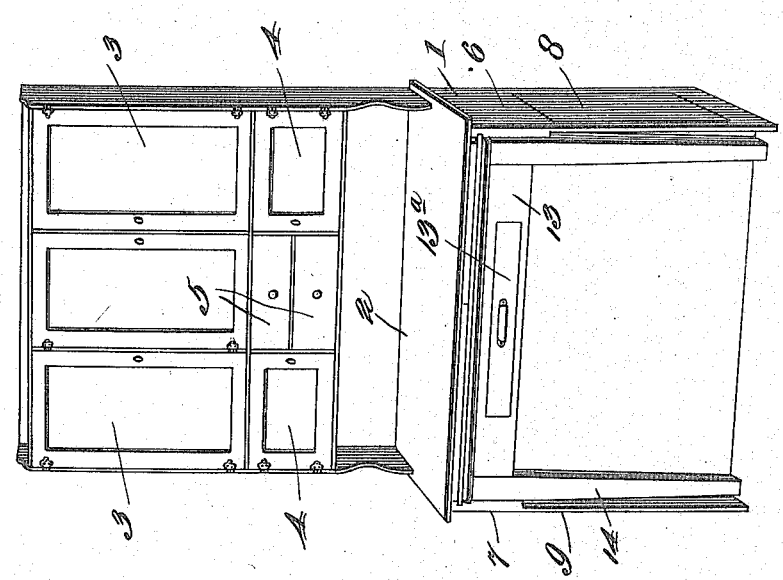
Witnesses
W. May Duvall.
Edwin J. Beller.
Inventor
Clarence H. Harris
by H. H. Byrne
Attorney

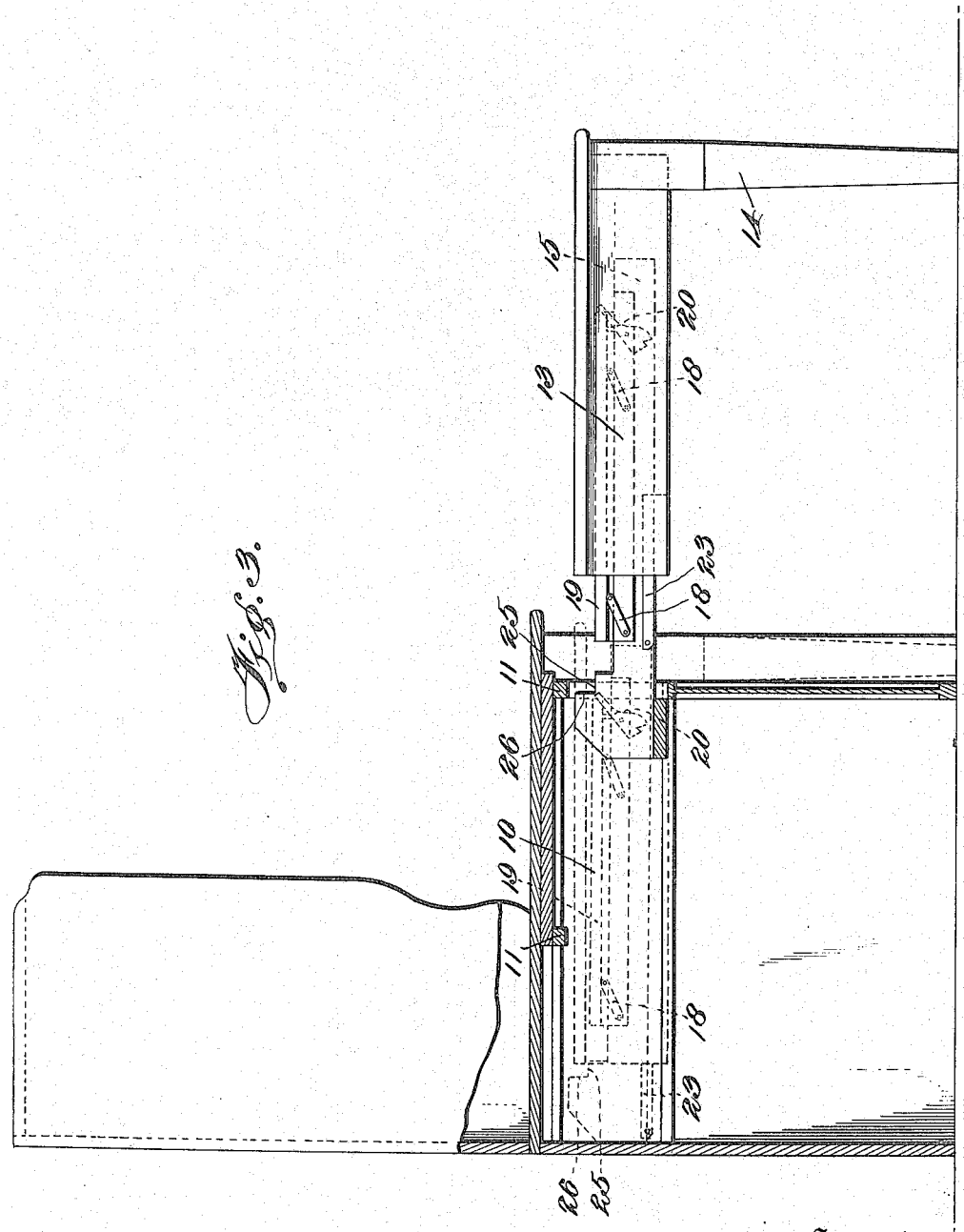

C. H. HARRIS.
COMBINED CABINET AND TABLE.
APPLICATION FILED APR. 21, 1913.
1,129,800.
Patented Feb. 23, 1915.
4 SHEETS—SHEET 3.
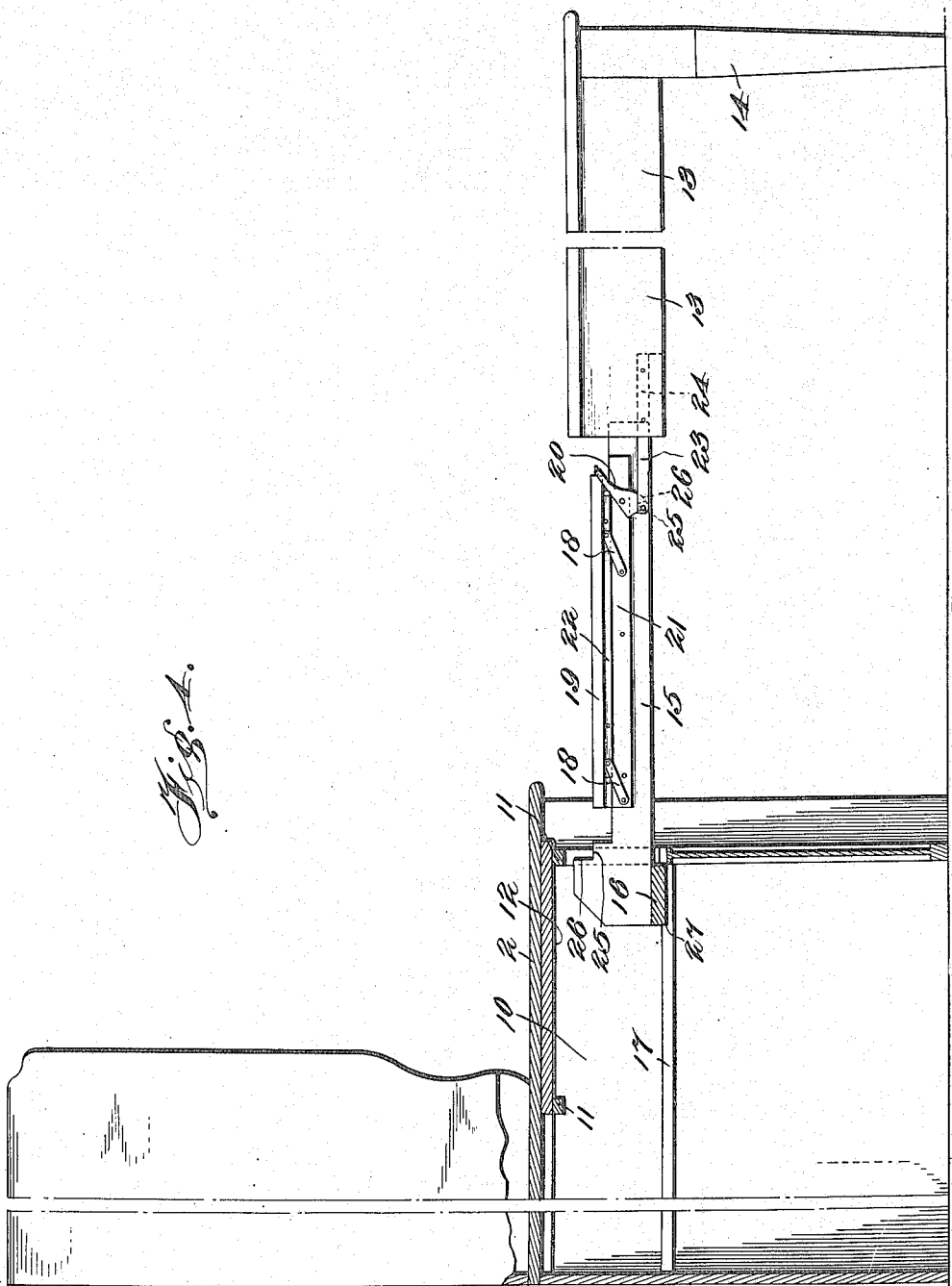

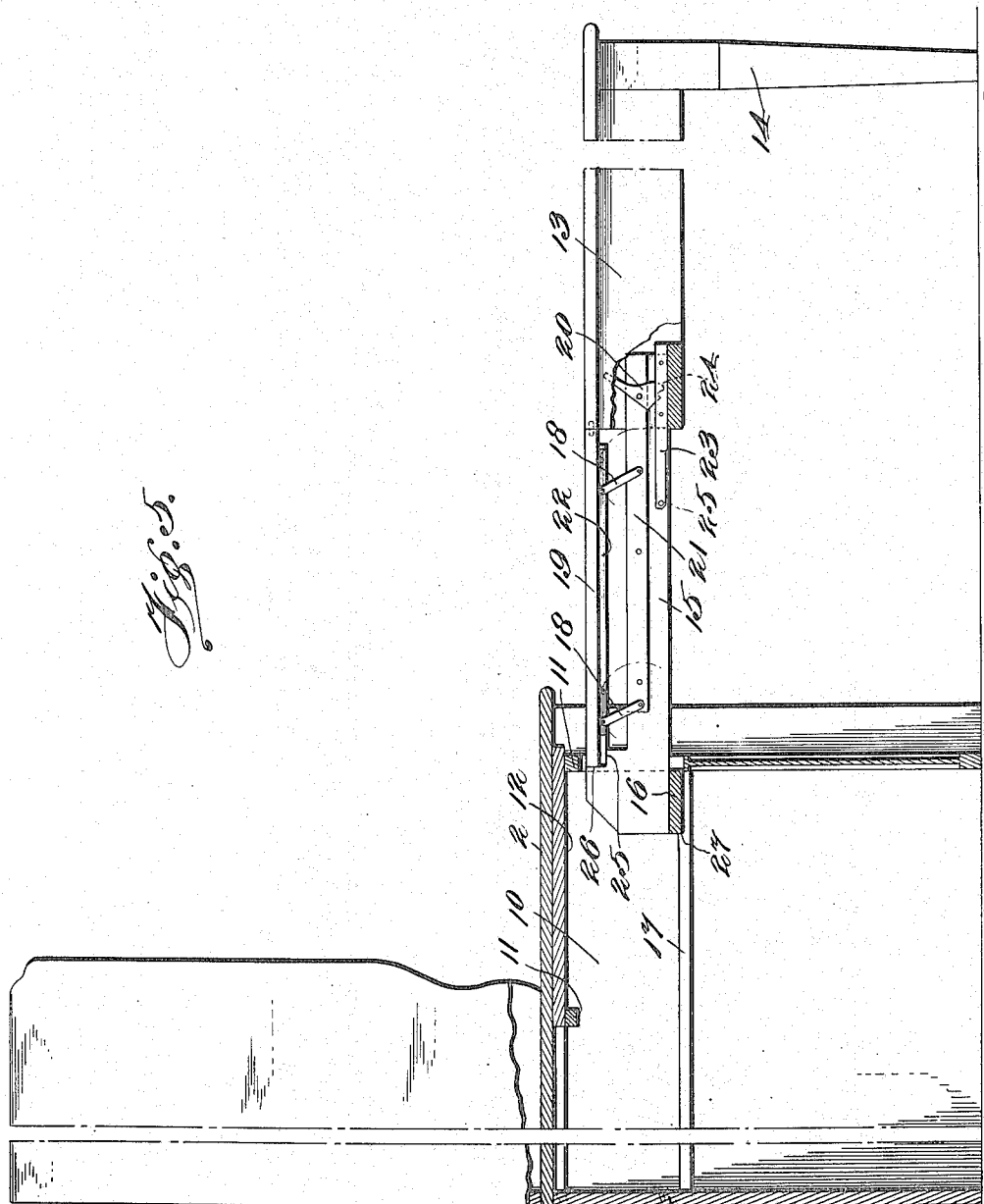

UNITED STATES PATENT OFFICE.

CLARENCE H. HARRIS, OF DENVER, COLORADO.

COMBINED CABINET AND TABLE.

1,129,800.  Specification of Letters Patent.  Patented Feb. 23, 1915.

Application filed April 21, 1913. Serial No. 762,622.

*To all whom it may concern:*

Be it known that I, CLARENCE H. HARRIS, a citizen of the United States of America, residing at Denver, in the county of Denver and State of Colorado, have invented certain new and useful Improvements in Combined Cabinets and Tables, of which the following is a specification.

The present invention relates to articles of furniture, and more especially to a combined kitchen cabinet and table, and has for its purpose to provide a piece of furniture of that character wherein the table may be readily housed within the cabinet when not in use; and wherein said table is of the automatic extension type to the end that the supplemental section may be raised to proper position through the extending movement of the table.

The invention has for its further purpose to provide a combined cabinet and table of simple design and construction; which will be comparatively inexpensive to manufacture; and which will be neat and attractive in appearance when in use either as a table or as a cabinet alone.

With these and other objects in view the invention consists in the novel details of construction and combination of parts more fully hereinafter described and particularly pointed out in the claim.

Referring to the drawings forming a part of this specification, in which like figures designate like parts in the several views, Figure 1 is a perspective view illustrating the table collapsed or closed in the cabinet; Fig. 2 is a similar view illustrating the table in extended position; Fig. 3 is a side elevational view, partly in section, showing the table partly extended; Fig. 4 is a view similar to Fig. 3 illustrating the table fully extended and the table leaf about to be raised; and Fig. 5 is a corresponding view showing the leaf raised and the table in proper position.

Referring to the construction in detail, the same consists of a cabinet 1 having the ordinary shelf 2 and a plurality of cupboards 3 and 4 of relatively different size and intended for the usual purposes as with other cabinets. A pair of drawers 5 are provided between the lower cupboards 4, and are designed to receive knives or forks, or to be used for any other purpose. The respective side portions 6 and 7 are in like manner constructed to provide receptacles 8 and 9 for holding dishes, pans or ordinary kitchen and table utensils. The cabinet 1 is further constructed to provide a chamber 10, which is designed to receive the extensible table when the same is in closed or collapsed position, as will be further explained. A pair of strips 11 are secured to the underside of the shelf 2 within the chamber 10 and provide supporting members for holding a board 12 for working dough.

The extensible table consists of a main section 13, supported at one end by ordinary table legs 14, and said main section is constructed to receive a drawer 13$^a$. An intermediate section or frame 15 is connected to the table section 13 and the cabinet and has relative movement therebetween, and said intermediate section provides the additional necessary supporting means for the main table section 13, as in the manner clearly illustrated in Fig. 5. The connection between said intermediate section and the cabinet consists of a cross bar or strip 16 secured to the intermediate section and adapted to be slidably supported on a strip or strips 17 suitably secured within the main section or body of the cabinet.

The intermediate section, and which may be defined as a carriage, has swingingly mounted thereon, by links 18, a table leaf 19 adapted, when not in use, to have that position shown in Figs. 3 and 4, and when in use to have that position illustrated in Fig. 5.

The means for raising the table leaf 19 automatically through the extension movement of the main table section 13 consists of a pair of dogs 20 pivotally mounted to the sides of the intermediate section 15 and adapted to engage with the end of the table leaf (see Fig. 4) and swing the same to raised position, as illustrated in Fig. 5. The respective sides of the intermediate section 15 and the table leaf 19 are provided with metallic strips 21 and 22 which have for their purpose to provide a suitable protecting covering for said parts, and to further form suitable bearings for the links 18 which are pivotally connected thereto, as in the manner shown.

The pair of dogs 20 for lifting the leaf are designed to be actuated through the medium of a pair of arms 23 secured to the cross piece 24 of the main table section 13, and carrying each a pin 25 that engages with the heel 26 of the dog (see Fig. 4) and swing said dog on its pivot when the table section is moved to its outermost position. When the leaf has been thus raised, it is supported at one end on ledges 25 formed on the sides of the intermediate section 15 and is held in position thereon through the medium of the abutments 26. The leaf 19 having been raised and supported in the position indicated, the main table section 13 is then closed against the table leaf 19 when the supporting surfaces of said leaf and the main table section will lie flush. The inward movement of the main table section, i. e., when it is closed against the raised leaf 19, operates to throw the dogs 20 from raised position to the downward position by reason of the pins 25 of the arms 23 engaging with said dogs. As an alternative to this means, however, it will be readily understood that the lifting dogs 20 may be of such weight and the weight thereof so distributed, that the dogs will, of themselves, fall down without having been positively tripped through engagement of the dog lifting arms 23.

The table, in its entirety, has its extension movement limited or defined through the medium of a suitable recess 27 formed in the cross piece or pieces 17 and designed to receive, with a snug fit, the cross bar 16 of the carriage or intermediate section 15. And, when it is desired to close the table within the cabinet, it is necessary only that the end section 13 be drawn out a sufficient distance to permit of the table leaf 19 being lowered (see Fig. 4) when the intermediate section or carriage is lifted to disengage the cross bar 16 when the carriage and leaf may be closed within the main section 13 and said section in turn shoved within the chamber 10 of the cabinet. These last mentioned operations of the carriage with its leaf, and the main table section, take place simultaneously, as will be understood.

It is obvious that those skilled in the art may vary the details of construction and arrangement of parts, without departing from the spirit of my invention, and therefore I do not wish to be limited to such features except as may be required by the claim.

Having thus described the invention, what I claim as new and desire to protect by United States Letters Patent, is:

The combination with a cabinet having a compartment and a slideway therein formed with a recess, of an extensible table therefor comprising a main section having supporting legs at one end; an intermediate section slidably connected with said main section and having a cross bar slidable on said compartment slideway and adapted to engage within the slideway recess to limit the extent of outward movement of said intermediate section; a leaf, links pivotally connecting said leaf with said intermediate section; a pair of dogs pivotally mounted on the intermediate section adjacent the outer end of said leaf and adapted to engage therewith; arms carried by the main section adapted to engage with said dogs to actuate the same to lift the leaf; and ledges on the inner end of said intermediate section having abutments adapted to limit the swinging movement of the leaf, and support the same in raised position; said intermediate section and leaf adapted to be inclosed within the main table section and said main section together with said intermediate section and the leaf adapted to be inclosed within the cabinet compartment, substantially as described.

In testimony whereof I affix my signature in presence of two witnesses.

CLARENCE H. HARRIS.

Witnesses:
 ENOS A. SPERRY,
 J. F. GORDON MILES.